United States Patent
Fukumoto et al.

[11] Patent Number: 5,709,102
[45] Date of Patent: Jan. 20, 1998

[54] HEAT PUMP COOLING-HEATING-DEHUMIDIFYING SYSTEM FOR ELECTRIC VEHICLE

[75] Inventors: Minoru Fukumoto, Nara; Norio Yoshida, Moriyama, both of Japan

[73] Assignee: Matsushita Electric Industrial Co., Ltd., Osaka, Japan

[21] Appl. No.: 598,987

[22] Filed: Feb. 9, 1996

[30] Foreign Application Priority Data

Feb. 16, 1995 [JP] Japan .................... 7-028160

[51] Int. Cl.$^6$ .................................................. F25B 13/00
[52] U.S. Cl. .................................. 62/324.1; 62/90
[58] Field of Search ................... 62/90, 324.1, 324.4, 62/324.5, 173

[56] References Cited

U.S. PATENT DOCUMENTS

| | | | |
|---|---|---|---|
| 5,355,690 | 10/1994 | Iritani et al. | 62/90 |
| 5,473,906 | 12/1995 | Hara et al. | 62/90 |

*Primary Examiner*—John M. Sollecto
*Attorney, Agent, or Firm*—Pollock, Vande Sande & Priddy

[57] ABSTRACT

A heat pump cooling-heating-dehumidifying system for an electric vehicle includes a compressor for compressing refrigerant, a refrigerant throttling device for achieving pressure reduction of the refrigerant, an out-room air-heat exchanger for heat-exchanging between the refrigerant and outside air, a first in-room air-heat exchanger for heat-exchanging between the refrigerant and air to be introduced into a car room, a second in-room air-heat exchanger provided downstream of the first in-room air-heat exchanger for selectively heat-exchanging between the refrigerant and the air which was heat-exchanged at the first in-room air-heat exchanger, and a four-way switching valve for switching a flow passage of the refrigerant. In each of the cooling operation and the dehumidifying-heating operation of the system, the refrigerant is circulated through the flow passage in order of the compressor, the second in-room air-heat exchanger, the four-way switching valve, the out-room air-heat exchanger, the refrigerant throttling device, the first in-room air-heat exchanger, the four-way switching valve and then the compressor. On the other hand, during the heating operation of the system, the refrigerant is circulated through the flow passage in order of the compressor, the second in-room air-heat exchanger, the four-way switching valve, the first in-room air-heat exchanger, the refrigerant throttling device, the out-room air-heat exchanger, the four-way switching valve and then the compressor.

7 Claims, 6 Drawing Sheets

5,709,102

HEAT PUMP COOLING-HEATING-DEHUMIDIFYING SYSTEM FOR ELECTRIC VEHICLE

BACKGROUND OF THE INVENTION

1. Field of the Invention

The present invention relates to a heat pump cooling-heating-dehumidifying system (heat pump air conditioner) for conditioning the air inside a room of an electric vehicle.

2. Description of the Prior Art

FIG. 4 is a structural diagram showing a conventional heat pump cooling-heating-dehumidifying system for an electric vehicle, wherein the system is under a cooling operation.

The conventional heat pump system includes a compressor 1, an out-room air-heat exchanger (an air-heat exchanger provided outside a car room or a vehicular passenger compartment) 2, an out-room blower 3, an in-room blower (a blower provided inside a car room or a vehicular passenger compartment) 6, an air circuit 9 connecting the in-room blower 6 and an air feed opening 8, a first in-room air-heat exchanger 10 provided in the air circuit 9, a second in-room air-heat exchanger 11 provided downstream of the first in-room air-heat exchanger 10 in the air circuit 9, and a damper 12 provided between the first and second in-room air-heat exchangers 10 and 11 in the air circuit 9 for adjusting an air amount introduced into the second in-room air-heat exchanger. The system further includes a four-way switching valve 7, refrigerant piping 5 connecting the compressor 1, the out-room air-heat exchanger 2, the first and second in-room air-heat exchangers 10 and 11 and the four-way switching valve 7, a first refrigerant throttling device 13 provided between the first and second in-room air-heat exchangers 10 and 11 in the refrigerant piping 5, and a second refrigerant throttling device 14 provided between the second in-room air-heat exchanger 11 and the out-room air-heat exchanger 2 in the refrigerant piping 5. The system further includes a first two-way valve 16 provided between the four-way switching valve 7 and the out-room air-heat exchanger 2 in the refrigerant piping 5, a refrigerant bypass circuit 15 bypassing the first two-way valve 16, the out-room air-heat exchanger 2 and the second refrigerant throttling device 14, and a second two-way valve 17 provided in the refrigerant bypass circuit 15.

In FIG. 4, arrows represent the flow of refrigerant during the cooling operation of the conventional heat pump system, wherein a portion of the piping where no refrigerant flows, that is, the refrigerant bypass circuit 15 in this case, is indicated by dotted lines. During the cooling operation, the damper 12 is set at a position shown by solid lines, the four-way switching valve 7 is set at a position shown by solid lines, and the second two-way valve 17 is set closed (dotted lines) so as to prevent the flow of refrigerant through the refrigerant bypass circuit 15. Further, the first two-way valve 16 is set open (solid lines), the second refrigerant throttling device 14 is set in a throttling state (solid lines) for throttling the refrigerant passing therethrough, and the first refrigerant throttling device 13 is set fully open (dotted lines) to provide no throttling.

With this arrangement, the high-temperature/high-pressure refrigerant discharged from the compressor 1 is first fed, via the four-way switching valve 7 and the first two-way valve 16, to the out-room air-heat exchanger 2 where radiation is achieved to cool and condense the refrigerant. Subsequently, the refrigerant is reduced in pressure through the second refrigerant throttling device 14, and then introduced into the first in-room air-heat exchanger 10 via the second in-room air-heat exchanger 11 and the first refrigerant throttling device 13. Through the first in-room air-heat exchanger 10, the refrigerant achieves heat exchange with the air sent from the in-room blower 6 so as to be vaporized while cooling and dehumidifying the sent air, and then returns to the compressor 1. In this fashion, the cooling of the air inside the car room is accomplished.

FIG. 5 is a structural diagram showing the conventional heat pump system, wherein the system is under a heating operation.

In FIG. 5, arrows represent the flow of refrigerant during the heating operation of the conventional heat pump system, wherein a portion of the piping where no refrigerant flows, that is, the refrigerant bypass circuit 15 in this case, is indicated by dotted lines. During the heating operation, the damper 12 is set at a position shown by solid lines, the four-way switching valve 7 is set at a position shown by solid lines, and the second two-way valve 17 is set closed (dotted lines) so as to prevent the flow of refrigerant through the refrigerant bypass circuit 15. Further, the first two-way valve 16 is set open (solid lines), the second refrigerant throttling device 14 is set in a throttling state (solid lines) for throttling the refrigerant passing therethrough, and the first refrigerant throttling device 13 is set fully open (dotted lines) to provide no throttling.

With this arrangement, the high-temperature/high-pressure refrigerant discharged from the compressor 1 is first fed, via the four-way switching valve 7, to the first in-room air-heat exchanger 10 where the refrigerant achieves heat exchange with the air sent from the in-room blower 6 for radiation and thus is cooled and condensed. The refrigerant is then fed, via the first refrigerant throttling device 13, to the second in-room air-heat exchanger 11 where further radiation is achieved. Subsequently, the refrigerant is reduced in pressure through the second refrigerant throttling device 14, and then introduced into the out-room air-heat exchanger 2. Through the out-room air-heat exchanger 2, the refrigerant achieves the heat absorption so as to be vaporized, and then returns to the compressor 1 via the first two-way valve 16. In this fashion, the heat pump heating of the air inside the car room is accomplished.

FIG. 6 is a structural diagram showing the conventional heat pump system, wherein the system is under a dehumidifying-heating operation.

In FIG. 6, arrows represent the flow of refrigerant during the dehumidifying-heating operation of the conventional heat pump system, wherein a portion of the piping (including the out-room air-heat exchanger 2) where no refrigerant flows, is indicated by dotted lines. During the dehumidifying-heating operation, the damper 12 is set at a position shown by solid lines, the four-way switching valve 7 is set at a position shown by solid lines, and the second two-way valve 17 is set open (solid lines) so as to allow the flow of refrigerant through the refrigerant bypass circuit 15. Further, the first two-way valve 16 is set closed (dotted lines) and the second refrigerant throttling device 14 is set fully closed (dotted lines) so as to prevent the flow of refrigerant through the out-room air-heat exchanger 2, and the first refrigerant throttling device 13 is set in a throttling state (solid lines) for throttling the refrigerant passing therethrough.

With this arrangement, the high-temperature/high-pressure refrigerant discharged from the compressor 1 is first fed, via the four-way switching valve 7 and the second two-way valve 17, to the second in-room air-heat exchanger 11 where radiation is achieved to condense the refrigerant.

Thereafter, the refrigerant is reduced in pressure through the first refrigerant throttling device 13, and then introduced into the first in-room air-heat exchanger 10. Through the first in-room air-heat exchanger 10, the refrigerant achieves the heat absorption so as to be vaporized, and then returns to the compressor 1. Accordingly, the air sent from the in-room blower 6 is cooled and dehumidified through the first in-room air-heat exchanger 10, and then heated through the second in-room air-heat exchanger 11 so that the dehumidifying-heating of the air inside the car room is accomplished.

As appreciated, components forming the refrigerating cycle, that is, the heat pump system, should be installed in limited space of the electric vehicle, along with other vehicular components. Further, it is necessary to increase the maximum possible travel distance by reducing the number of components for weight reduction so as to lower the load applied to a motor of the electric motor. Thus, it is required to reduce the installing space for the refrigerating cycle components and the number of such components. However, as shown in FIG. 4, the conventional heat pump system requires the refrigerant bypass circuit 15 including the second two-way valve 17 for bypassing the out-room air-heat exchanger 2, and the first two-way valve 16 between the out-room air-heat exchanger 2 and the four-way switching valve 7. The conventional heat pump system further requires the first refrigerant throttling device 13 between the first in-room air-heat exchanger 10 and the second in-room air-heat exchanger 11. This increases the number of components forming the refrigerating cycle and renders the structure complicated. Further, when switching the operation mode of the system, the complex control is required for controlling the operation states of the two-way valves and the refrigerant throttling devices. This increases the number of components for such a complex control and renders the structure complicated.

As appreciated, the compressor is a component which is most likely to be worn and damaged among the components of the system due to its active operation and whose operation failure directly causes heating or cooling failure of the system. Thus, it is essential to fully ensure the reliability of the compressor. However, in the foregoing conventional heat pump system, the out-room air-heat exchanger is bypassed during the dehumidifying-heating operation by closing inlet and outlet sides thereof so that the out-room air-heat exchanger is isolated from the refrigerating cycle. This causes the refrigerant and the lubricant oil to stay in the out-room air-heat exchanger. Thus, the compressor is operated with smaller amounts of the refrigerant and the lubricant oil so that the wear is advanced inside the compressor to largely reduce the reliability of the compressor.

Further, in the conventional heat pump system, since the out-room air-heat exchanger is bypassed during the dehumidifying-heating operation, the condensing operation is performed only in the second in-room air-heat exchanger and the vaporizing operation is performed only in the first in-room a-heat exchanger. Accordingly, if a feed quantity of the air into the car room is small, the condensation can not be fully achieved only by the second in-room air-heat exchanger, and thus, the vaporization by the first in-room air-heat exchanger is deteriorated. This leads to insufficient capability of the system so that the inside of the car room can not be held comfortable. Further, since the insufficient capability of the system causes clouding of the car windows depending on a weather condition, there raises a serious problem in view of safety of the driving.

SUMMARY OF THE INVENTION

Therefore, it is an object of the present invention to provide an improved heat pump cooling-heating-dehumidifying system, that is, an improved heat pump air conditioner, for an electric vehicle.

According to one aspect of the present invention, a heat pump cooling-heating-dehumidifying system for an electric vehicle comprises a compressor for compressing refrigerant; a refrigerant throttling device for achieving pressure reduction of the refrigerant; an out-room air-heat exchanger for heat-exchanging between the refrigerant and outside air; a first in-room air-heat exchanger for heat-exchanging between the refrigerant and air to be introduced into a car room; a second in-room air-heat exchanger provided downstream of the first in-room air-heat exchanger for selectively heat-exchanging between the refrigerant and the air which was heat-exchanged at the first in-room air-heat exchanger; and a four-way switching valve for switching a flow passage of the refrigerant, the flow passage including therein the compressor, the refrigerant throttling device, the out-room air-heat exchanger, the first in-room air-heat exchanger, the second in-room air-heat exchanger and the four-way switching valve, wherein the refrigerant is circulated through the flow passage in order of the compressor, the second in-room air-heat exchanger, the four-way switching valve, the out-room air-heat exchanger, the refrigerant throttling device, the first in-room air-heat exchanger, the four-way switching valve and then the compressor during each of a cooling operation of the system and a dehumidifying-heating operation of the system, and wherein the refrigerant is circulated through the flow passage in order of the compressor, the second in-room air-heat exchanger, the four-way switching valve, the first in-room air-heat exchanger, the refrigerant throttling device, the out-room air-heat exchanger, the four-way switching valve and then the compressor during a heating operation of the system.

It may be arranged that the second in-room air-heat exchanger is prevented, during the cooling operation of the system, from achieving heat-exchange between the refrigerant and the air which was heat-exchanged at the first in-room air-heat exchanger.

It may be ganged that means is provided between the first and second in-room air-heat exchangers for adjusting an amount of the air introduced into the second in-room air-heat exchanger from the first in-room air-heat exchanger and that the means prevents introduction of the air from the first in-room air-heat exchanger into the second in-room air-heat exchanger during the cooling operation of the system.

It may be ganged that the means allows introduction of the air from the first in-room air-heat exchanger into the second in-room air-heat exchanger during the dehumidifying-heating operation of the system.

It may be arranged that the means allows introduction of the air from the first in-room air-heat exchanger into the second in-room air-heat exchanger during the heating operation of the system.

It may be arranged that means is provided between the first and second in-room air-heat exchangers for adjusting an amount of the air introduced into the second in-room air-heat exchanger from the first in-room air-heat exchanger and that the means prevents introduction of the air from the first in-room air-heat exchanger into the second in-room air-heat exchanger during the cooling operation of the system, while allowing introduction of the air from the first in-room air-heat exchanger into the second in-room air-heat exchanger during each of the heating operation and the dehumidifying-heating operation of the system.

It may be arranged that the refrigerant throttling device is in the form of one of a capillary tube, an electric expansion valve and a temperature-sensitive expansion valve.

5

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings. Throughout the figures including the figures showing the prior art, the same signs or symbols represent the same or like components.

Figure 1:
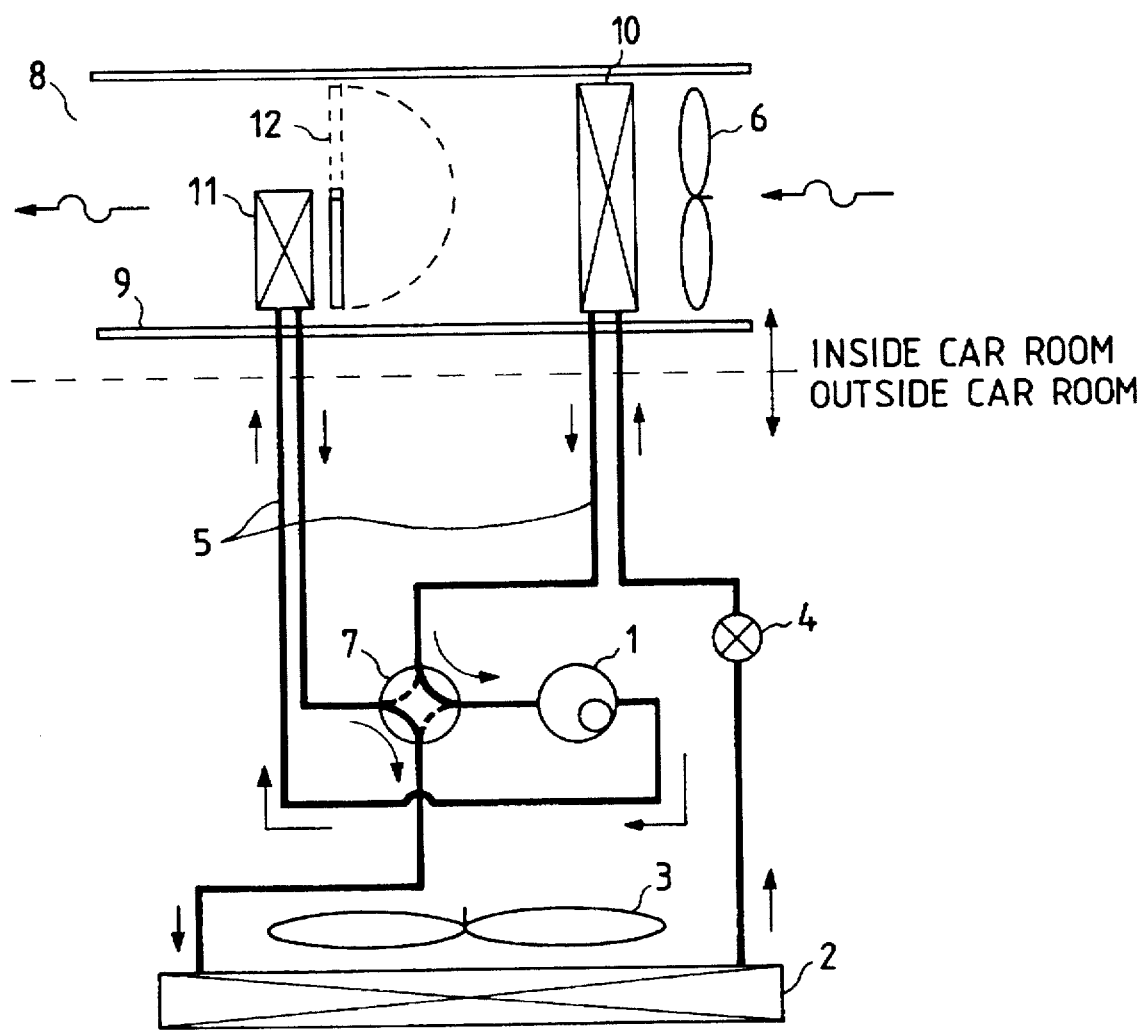
FIG. 1 is a structural diagram showing a heat pump cooling-heating-dehumidifying system for an electric vehicle according to a preferred embodiment of the present invention, wherein the system is under a cooling operation.

FIG. 1 is a structural diagram showing a heat pump cooling-heating-dehumidifying system for an electric vehicle according to the preferred embodiment of the present invention, wherein the system is under a cooling operation.

The heat pump system includes a compressor 1, an out-room air-heat exchanger 2, an out-room blower 3, an in-room blower 6, an air circuit 9 connecting the in-room blower 6 and an air feed opening 8, a first in-room air-heat exchanger 10 provided in the air circuit 9, a second in-room air-heat exchanger 11 provided downstream of the first in-room air-heat exchanger 10 in the air circuit 9, and a damper 12 provided between the first and second in-room air-heat exchangers 10 and 11 in the air circuit 9 for adjusting an air amount introduced into the second in-room air-heat exchanger. The system further includes a four-way switching valve 7, a refrigerant throttling device 4, and refrigerant piping 5 connecting the compressor 1, the out-room air-heat exchanger 2, the first and second in-room air-heat exchangers 10 and 11, the four-way switching valve 7 and the refrigerant throttling device 4.

In FIG. 1, arrows represent the flow of refrigerant during the cooling operation of the heat pump system. During the cooling operation, the damper 12 is set at a position shown by solid lines to prevent heat exchange at the second in-room air-heat exchanger 11, and the four-way switching valve 7 is set at a position shown by solid lines.

With this arrangement, the high-temperature/high-pressure refrigerant discharged from the compressor 1 is first introduced, via the second in-room air-heat exchanger 11, into the four-way switching valve 7 where the refrigerant is directed so as to be fed to the out-room air-heat exchanger 2. Through the out-room air-heat exchanger 2, the refrigerant achieves heat exchange with the outside air so as to be condensed. Subsequently, the refrigerant is reduced in pressure through the refrigerant throttling device 4 and then fed to the first in-room air-heat exchanger 10 where the refrigerant achieves heat exchange with the air sent from the in-room blower 6 so as to be vaporized. Thereafter, the refrigerant returns to the compressor 1 via the four-way switching valve 7. Accordingly, the air conditioning inside the car room is achieved by heat-exchanging between the air sent from the in-room blower 6 and the refrigerant at the first in-room air-heat exchanger 10 so as to cool and dehumidify the air.

Figure 2:
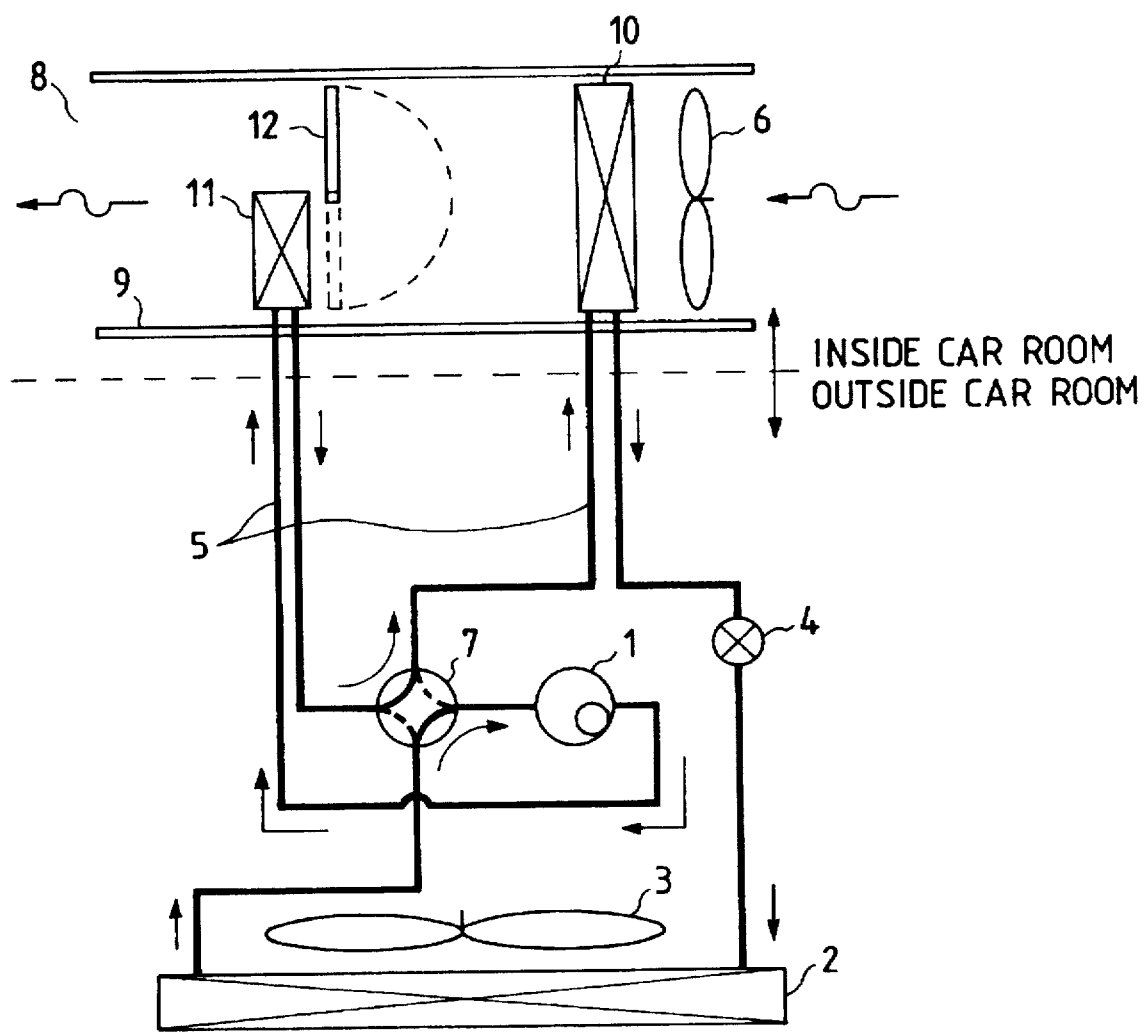
FIG. 2 is a structural diagram showing the heat pump cooling-heating-dehumidifying system according to the preferred embodiment of the present invention, wherein the system is under a heating operation.

FIG. 2 is a structural diagram showing the heat pump cooling-heating-dehumidifying system according to the preferred embodiment of the present invention, wherein the system is under a heating operation.

In FIG. 2, arrows represent the flow of refrigerant during the heating operation of the heat pump system. During the heating operation, the damper 12 is set at a position shown by solid lines to allow heat exchange at the second in-room air-heat exchanger 11, and the four-way switching valve 7 is set at a position shown by solid lines.

With this arrangement, the high-temperature/high-pressure refrigerant discharged from the compressor 1 is first introduced into the second in-room a-heat exchanger 11 where the refrigerant achieves heat exchange so as to be condensed. Then, the refrigerant flows into the four-way switching valve 7 where the refrigerant is directed so as to be fed to the first in-room air-heat exchanger 10. Through the first in-room air-heat exchanger 10, the refrigerant further achieves heat exchange for further condensation. Subsequently, the refrigerant is reduced in pressure through the refrigerant throttling device 4 and then fed to the out-room air-heat exchanger 2 where the refrigerant achieves heat exchange so as to be vaporized. Thereafter, the refrigerant returns to the compressor 1 via the four-way switching valve 7. Accordingly, the air conditioning inside the car room is achieved by heat-exchanging between the air sent from the in-room blower 6 and the refrigerant at the first and second in-room air-heat exchangers 10 and 11 so as to heat the air.

Figure 3:
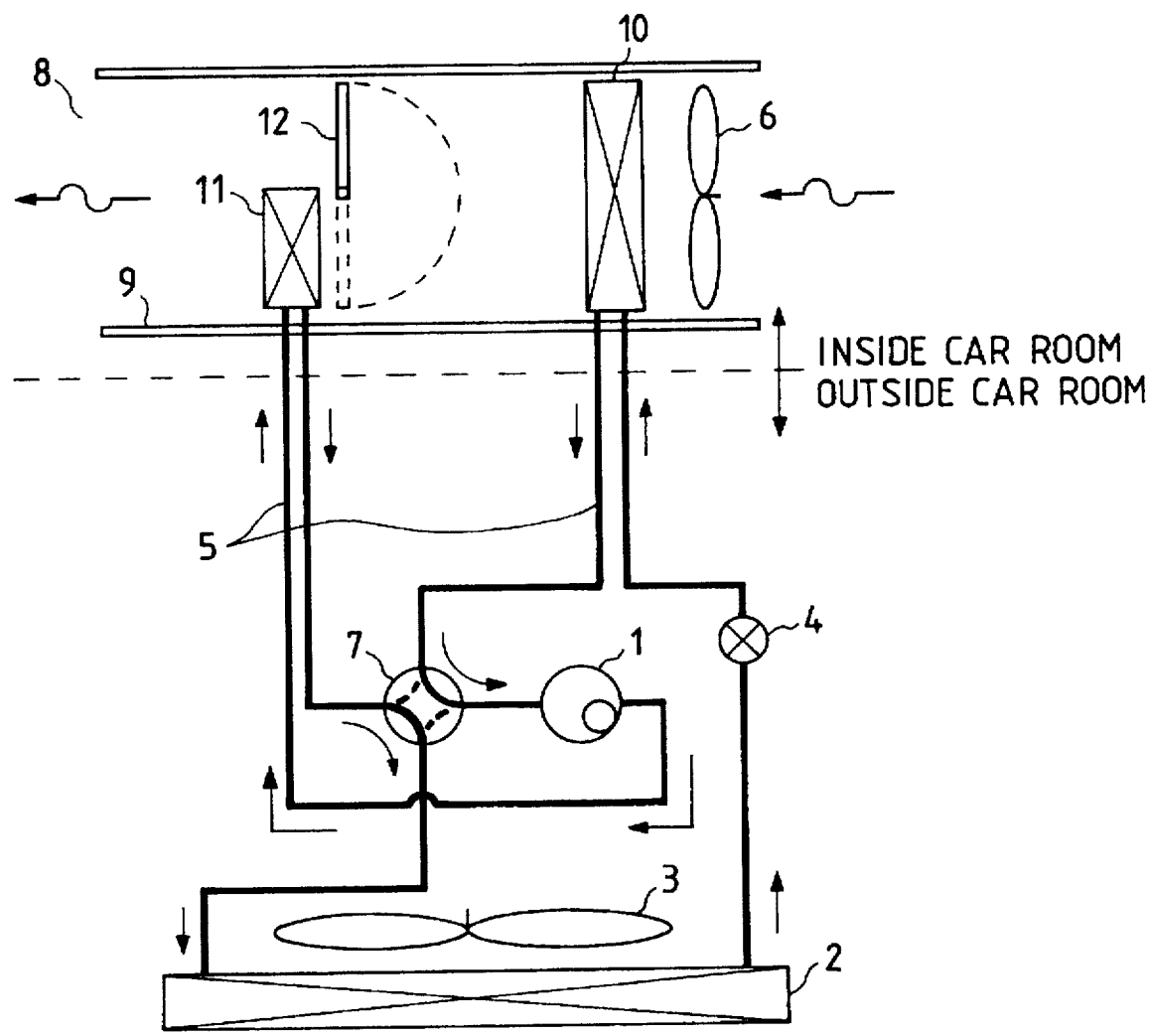
FIG. 3 is a structural diagram showing the heat pump cooling-heating-dehumidifying system according to the preferred embodiment of the present invention, wherein the system is under a dehumidifying-heating operation.
Figure 4:
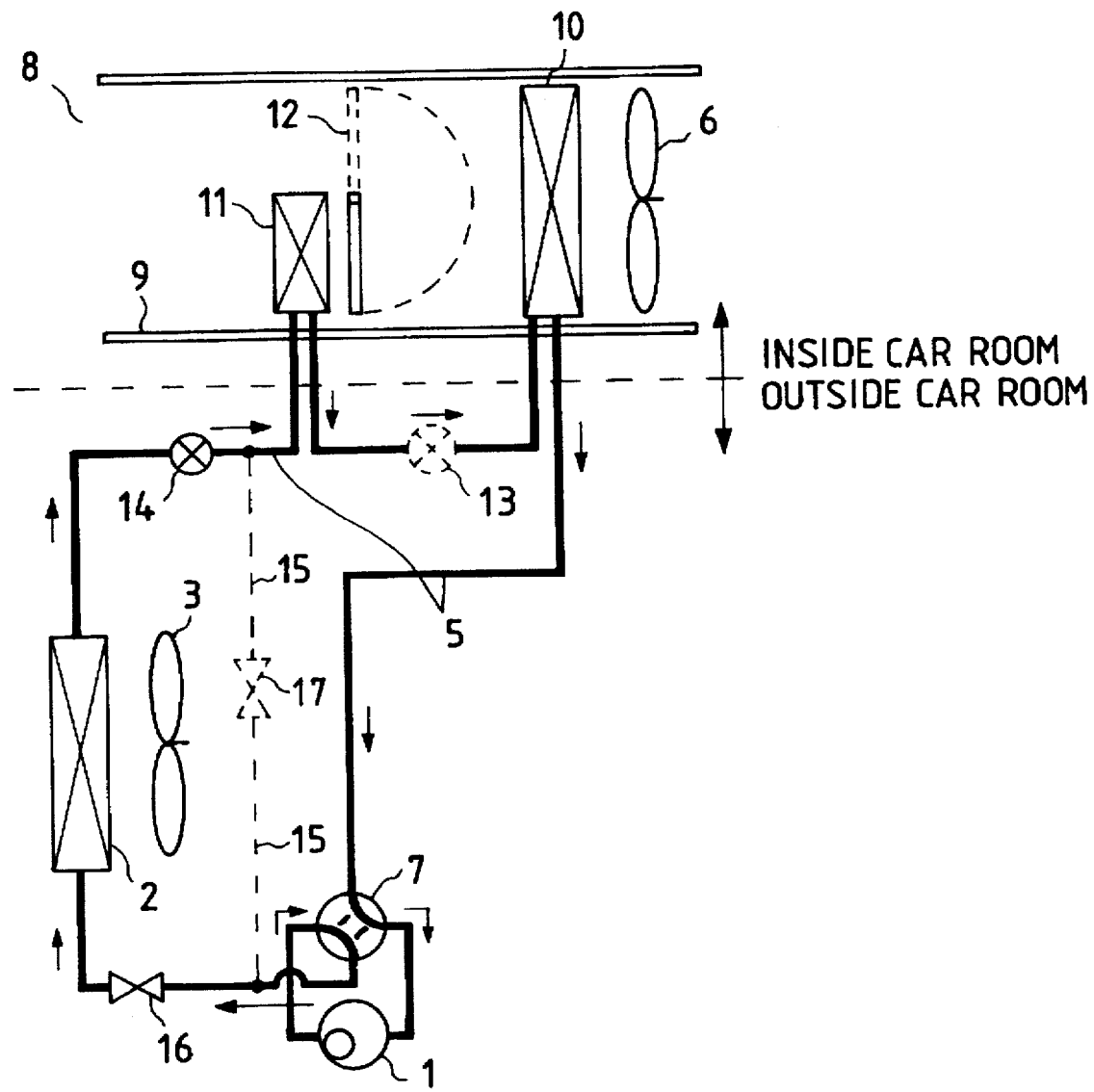
FIG. 4 is a structural diagram showing a conventional heat pump cooling-heating-dehumidifying system for an electric vehicle, wherein the system is under a cooling operation.
Figure 5:
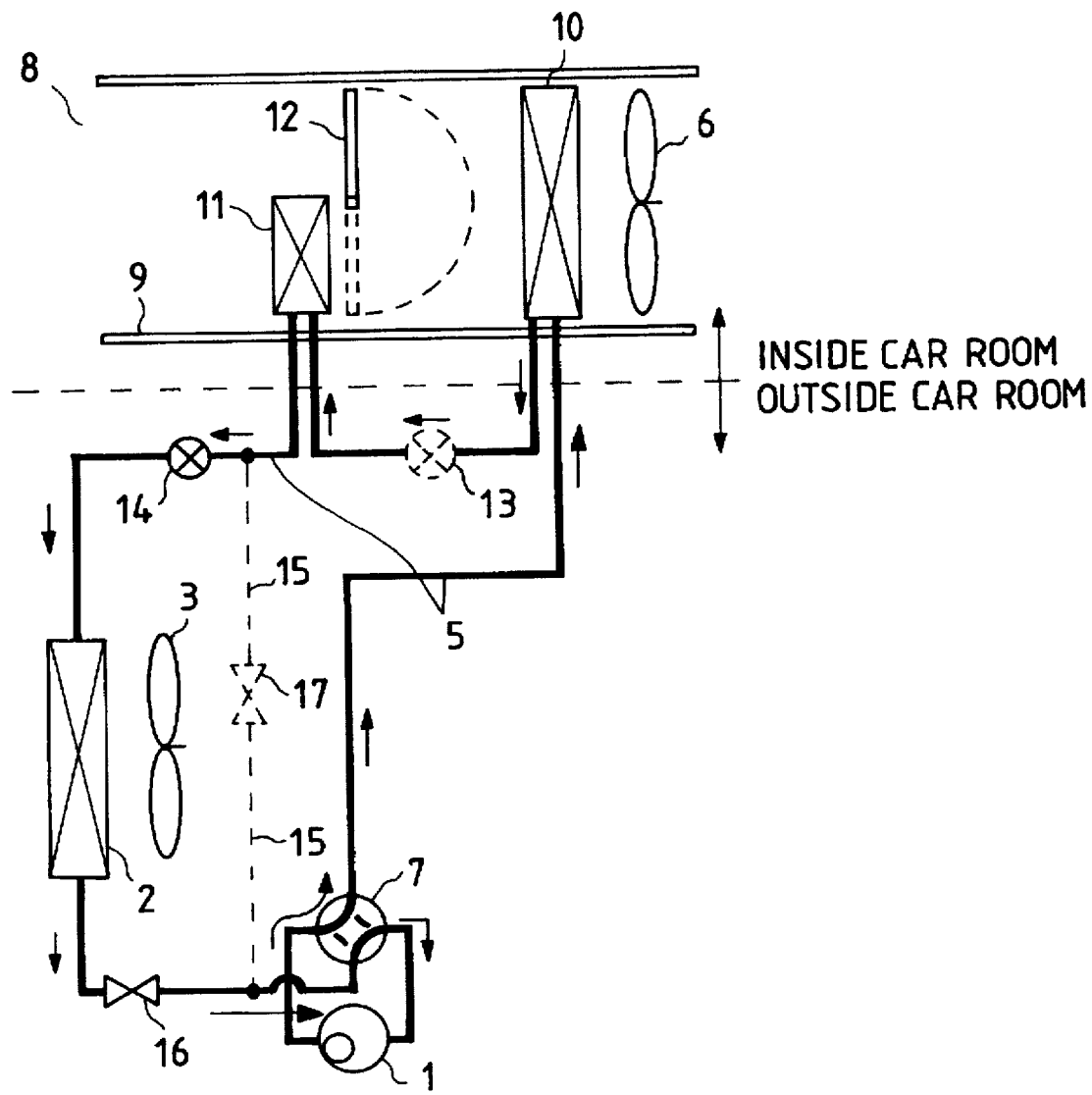
FIG. 5 is a structural diagram showing the conventional heat pump cooling-heating-dehumidifying system, wherein the system is under a heating operation.
Figure 6:
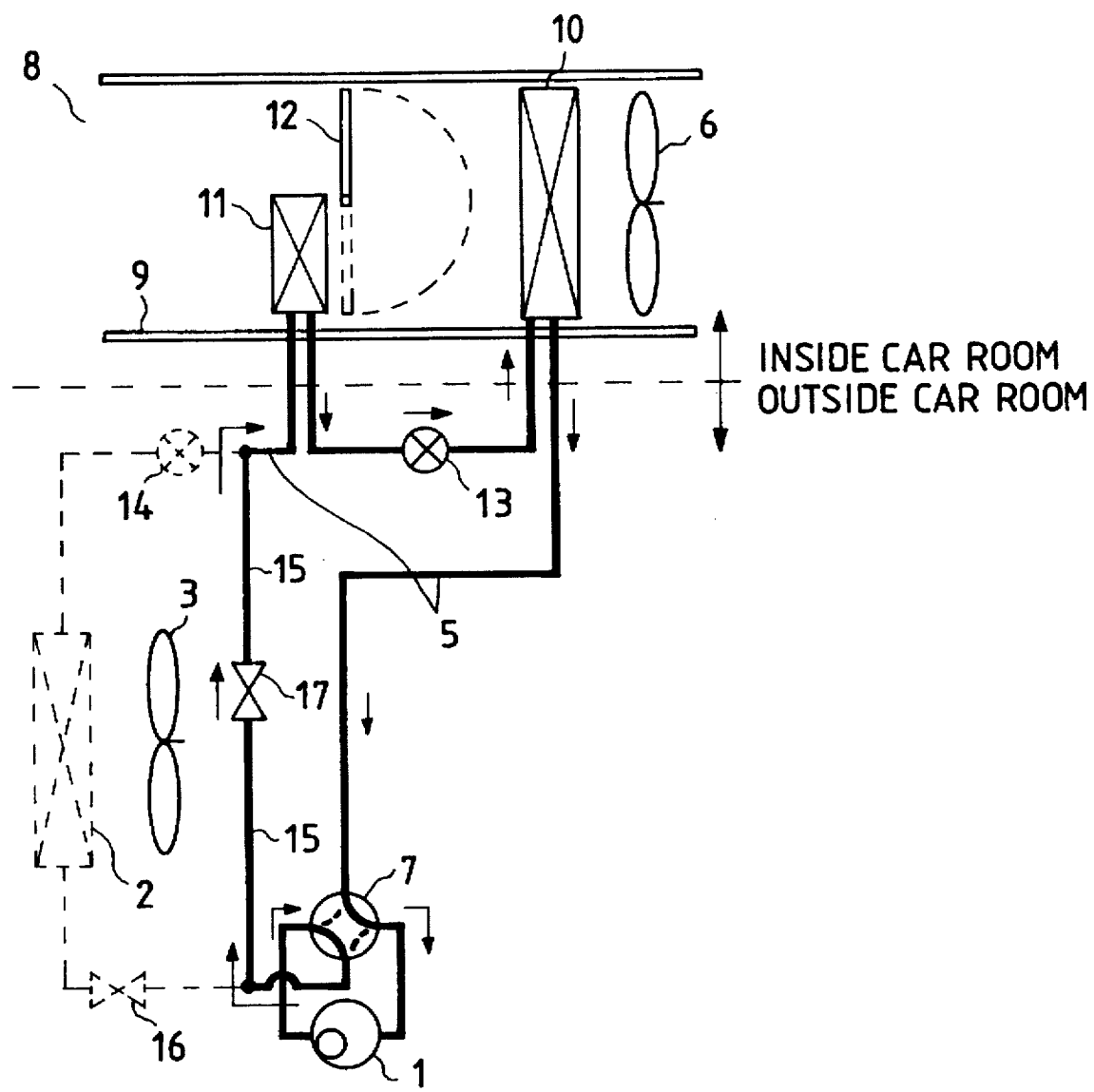
FIG. 6 is a structural diagram showing the conventional heat pump cooling-heating-dehumidifying system, wherein the system is under a dehumidifying-heating operation.

FIG. 3 is a structural diagram showing the heat pump cooling-heating-dehumidifying system according to the preferred embodiment of the present invention, wherein the system is under a dehumidifying-heating operation.

In FIG. 3, arrows represent the flow of refrigerant during the dehumidifying-heating operation of the heat pump system. During the dehumidifying-heating operation, the damper 12 is set at a position shown by solid lines to allow heat exchange at the second in-room air-heat exchanger 11, and the four-way switching valve 7 is set at a position shown by solid lines.

With this arrangement, the high-temperature/high-pressure refrigerant discharged from the compressor 1 is first introduced into the second in-room a-heat exchanger 11 where the refrigerant achieves heat exchange so as to be condensed. Then, the refrigerant flows into the four-way switching valve 7 where the refrigerant is directed so as to be fed to the out-room air-heat exchanger 2. Through the out-room air-heat exchanger 2, the refrigerant further achieves heat exchange for further condensation. Subsequently, the refrigerant is reduced in pressure through the refrigerant throttling device 4 and then fed to the first in-room air-heat exchanger 10 where the refrigerant achieves heat exchange so as to be vaporized. Thereafter, the refrigerant returns to the compressor 1 via the four-way switching valve 7. Since the refrigerant which has not sufficiently radiated at the second in-room air-heat exchanger 11 can further radiate at the out-room air-heat exchanger 2, the refrigerant can achieve radiation to a greater extent so that the refrigerant can be vaporized efficiently at the first in-room air-heat exchanger 10. Accordingly, the air conditioning inside the car room is achieved by heat-exchanging between the air sent from the in-room blower 6 and the refrigerant at the first in-room air-heat exchanger 10 so as to cool and dehumidify the air and then by heat-exchanging between the air from the first in-room air-heat exchanger 10 and the refrigerant at the second in-room air-heat exchanger 11 so as to heat the air. In this fashion, the dehumidifying-heating of the air inside the car room is accomplished.

During the dehumidifying-heating operation, a position of the damper 12 may be adjustably set between the solid-line position and the dotted-line position in FIG. 3. By adjusting an air quantity heated at the second in-room air-heat exchanger 11, a temperature of the air blown out from the air feed opening 8 can be adjusted.

As described above, according to the preferred embodiment of the present invention, the refrigerant discharged from the compressor is first conducted to the second in-room air-heat exchanger 11 and then to the four-way switching valve 7. At the four-way switching valve 7, the refrigerant is directed so as to advance to the first in-room air-heat exchanger 10 or the out-room air-heat exchanger 2, and then passes the refrigerant throttling device 4.

Accordingly, only one four-way switching valve is required for switching the flow direction of refrigerant as compared with the foregoing conventional heat pump system which further requires the first and second two-way valves 16 and 17 and the refrigerant bypass circuit 15. Further, only one refrigerant throttling device is required as compared with the foregoing conventional heat pump system which requires two. Accordingly, the number of components forming the refrigerating cycle and the number of components for controlling switching of the operation mode can be reduced. This contributes to facilitation of the system assembling, size and weight reduction of the system and reduction of the system installation space. Further, since there is no circuit bypassing the air-heat exchanger, even when the operation mode is switched, no isolated circuit is caused. Thus, no stagnation of the refrigerant and the lubricant oil is caused so that the reliability of the compressor can be enhanced. Further, since the condensing operation can be performed both at the second in-room air-heat exchanger and the out-room nit-heat exchanger during the dehumidifying-heating operation, the vaporization of the refrigerant can be achieved with high efficiency. Thus, the capability of the system during the dehumidifying-heating operation can be improved so that the inside of the car room is held comfortable with no clouding of the car windows.

In the foregoing preferred embodiment, the refrigerant throttling device 4 may be in the form of a capillary tube, an electric expansion valve or a temperature-sensitive expansion valve.

While the present invention has been described in terms of the preferred embodiment, the invention is not to be limited thereto, but can be embodied in various ways without departing from the principle of the invention as defined in the appended claims.

What is claimed is:

1. A heat pump cooling-heating-dehumidifying system for an electric vehicle, comprising:

a compressor for compressing refrigerant;

a refrigerant throttling device for achieving pressure reduction of the refrigerant;

an out-room air-heat exchanger for heat-exchanging between the refrigerant and outside air;

a first in-room air-heat exchanger for heat-exchanging between the refrigerant and air to be introduced into a car room;

a second in-room air-heat exchanger provided downstream of said first in-room air-heat exchanger for selectively heat-exchanging between the refrigerant and the air which was heat-exchanged at said first in-room air-heat exchanger; and a four-way switching valve for switching a flow passage of the refrigerant, said flow passage including therein said compressor, said refrigerant throttling device, said out-room air-heat exchanger, said first in-room air-heat exchanger, said second in-room air-heat exchanger and said four-way switching valve, wherein the refrigerant is circulated through the flow passage in order of said compressor, said second in-room air-heat exchanger, said four-way switching valve, said out-room air-heat exchanger, said refrigerant throttling device, said first in-room air-heat exchanger, said four-way switching valve and then said compressor during each of a cooling operation of the system and a dehumidifying-heating operation of the system, and wherein the refrigerant is circulated through the flow passage in order of said compressor, said second in-room air-heat exchanger, said four-way switching valve, said first in-room air-heat exchanger, said refrigerant throttling device, said out-room air-heat exchanger, said four-way switching valve and then said compressor during a heating operation of the system.

2. The system according to claim 1, wherein said second in-room air-heat exchanger is prevented, during said cooling operation of the system, from achieving heat-exchange between the refrigerant and the air which was heat-exchanged at said first in-room air-heat exchanger.

3. The system according to claim 2, wherein means is provided between said first and second in-room air-heat exchangers for adjusting an amount of the air introduced into said second in-room air-heat exchanger from said first in-room air-heat exchanger and wherein said means prevents introduction of the air from said first in-room air-heat exchanger into said second in-room air-heat exchanger during said cooling operation of the system.

4. The system according to claim 3, wherein said means allows introduction of the air from said first in-room air-heat exchanger into said second in-room air-heat exchanger during said dehumidifying-heating operation of the system.

5. The system according to claim 4, wherein said means allows introduction of the air from said first in-room air-heat exchanger into said second in-room air-heat exchanger during said heating operation of the system.

6. The system according to claim 1, wherein means is provided between said first and second in-room air-heat exchangers for adjusting an amount of the air introduced into said second in-room air-heat exchanger from said first in-room air-heat exchanger and wherein said means prevents introduction of the air from said first in-room air-heat exchanger into said second in-room air-heat exchanger during said cooling operation of the system, while allowing introduction of the air from said first in-room air-heat exchanger into said second in-room air-heat exchanger during each of said heating operation and said dehumidifying-heating operation of the system.

7. The system according to claim 1, wherein said refrigerant throttling device is in the form of one of a capillary tube, an electric expansion valve and a temperature-sensitive expansion valve.

* * * * *